(12) United States Patent
Feng et al.

(10) Patent No.: US 11,093,723 B2
(45) Date of Patent: Aug. 17, 2021

(54) COAXIAL AIMER FOR IMAGING SCANNER

(71) Applicant: HAND HELD PRODUCTS, INC., Fort Mill, SC (US)

(72) Inventors: Chen Feng, Morris Plains, NJ (US); Jie Ren, Morris Plains, NJ (US); Yunxin Ouyang, Morris Plains, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 16/631,257

(22) PCT Filed: Jul. 19, 2017

(86) PCT No.: PCT/CN2017/093459
§ 371 (c)(1),
(2) Date: Jan. 15, 2020

(87) PCT Pub. No.: WO2019/014862
PCT Pub. Date: Jan. 24, 2019

(65) Prior Publication Data
US 2020/0210663 A1 Jul. 2, 2020

(51) Int. Cl.
*G06K 7/14* (2006.01)
(52) U.S. Cl.
CPC ......... *G06K 7/1404* (2013.01); *G06K 7/1413* (2013.01); *G06K 7/1417* (2013.01)
(58) Field of Classification Search
CPC ........................... G06K 7/1404; G06K 7/1413
(Continued)

(56) References Cited

U.S. PATENT DOCUMENTS

| 7,705,288 B2 | 4/2010 | Gannon et al. |
| 7,726,575 B2 | 6/2010 | Wang et al. |
| (Continued) | | |

FOREIGN PATENT DOCUMENTS

| CN | 102709297 A | 10/2012 |
| CN | 102918543 A | 2/2013 |
| (Continued) | | |

OTHER PUBLICATIONS

International Search Report of the International Searching Authority for PCT/CN2017/093459 dated Apr. 18, 2018.
(Continued)

*Primary Examiner* — Allyson N Trail
(74) *Attorney, Agent, or Firm* — Alston & Bird LLP

(57) ABSTRACT

An aimer pattern projector assembly (200, 300) includes an LED light source (212, 312), an LED aperture plate (204, 304), and a projector lens (206, 306) disposed in front of and coaxial with the LED aperture plate (204, 304) and the LED light source (212, 312). The LED light source (212, 312), aperture plate (204, 304), and projector lens (206, 306) each have a central opening configured to accommodate and coaxially align with a line of sight of an imaging lens. The LED light source (212, 312) can include two or more LEDs operably coupled to a PCB. A coaxial aimer imager assembly (100) can include an imaging lens-sensor module (102) and the aimer pattern projector assembly. A method for scanning includes generating a combined aimer pattern coaxially aligned with a line of sight of an image of the object.

20 Claims, 9 Drawing Sheets

(58) Field of Classification Search
USPC .......... 235/462.01, 462.21, 462.42, 254
See application file for complete search history.

(56) References Cited

U.S. PATENT DOCUMENTS

| | | | |
|---|---|---|---|
| 8,450,708 B2 | 5/2013 | Liu et al. | |
| 8,537,245 B2 | 9/2013 | Jovanovski et al. | |
| 9,639,728 B1 | 5/2017 | Handshaw et al. | |
| 10,436,422 B1* | 10/2019 | Takacs | F21V 5/04 |
| 2002/0125322 A1 | 9/2002 | McCall et al. | |
| 2007/0228306 A1 | 10/2007 | Gannon et al. | |
| 2008/0296383 A1* | 12/2008 | Gurevich | G06K 7/10732 235/462.21 |
| 2010/0155481 A1* | 6/2010 | Vinogradov | G06K 7/10801 235/462.21 |
| 2010/0155485 A1* | 6/2010 | Tan | G06K 7/10702 235/462.42 |
| 2011/0212751 A1* | 9/2011 | Havens | G06Q 30/0601 455/556.1 |
| 2011/0297853 A1 | 12/2011 | Liu et al. | |
| 2012/0224083 A1 | 9/2012 | Jovanovski et al. | |
| 2015/0097035 A1* | 4/2015 | Duan | G06K 7/10732 235/462.21 |
| 2015/0200074 A1* | 7/2015 | Hamaguchi | H01J 37/3007 250/396 R |
| 2015/0332076 A1* | 11/2015 | Feng | G06K 7/015 235/454 |
| 2016/0042241 A1* | 2/2016 | Todeschini | G06K 9/228 345/179 |
| 2019/0294839 A1* | 9/2019 | Tan | G06K 7/10881 |
| 2020/0336631 A1* | 10/2020 | Biasini | H04N 5/23238 |

FOREIGN PATENT DOCUMENTS

| | | |
|---|---|---|
| CN | 206339997 U | 7/2017 |
| WO | 2002/073953 A2 | 9/2002 |

OTHER PUBLICATIONS

Communication pursuant to Rules 161(2) and 162, for European Application No. 17918568.1, dated Feb. 26, 2020, 3 pages.
Written Opinion for International Application No. PCT/CN2017/093459, dated Apr. 18, 2018, 3 pages.
Extended European Search Report issued in EP Application No. 17918568.1 dated Jan. 22, 2021, 10 pages.

* cited by examiner

COAXIAL AIMER FOR IMAGING SCANNER

FIELD OF THE INVENTION

The present invention relates to image scanning, and more particularly to coaxial aimer imager assembly and aimer pattern projector assembly.

BACKGROUND

Modern imaging barcode scanners are equipped with aimer pattern projector indicating center of the image and effective field of view. Due to the space conflict, the aimer projector can only be disposed off-axially relative to the imaging lens. The offset between an imaging lens axis and an aimer lens creates aiming error, especially at near field viewing of small objects. The offset between image line of sight and aimer beam center is typically 7-10 mm. There are some products aiming to compensate for this error by tilting the aiming beam. However, this compensation only works at a certain object distance. As products (such as electronic components) become smaller and smaller, the barcodes also become smaller. There are very small barcodes directly marked on the product (DPM) with size of only few millimeters. The object is at a very close distance when small code is being read. In such situations, the aimer beam error will significantly affect barcode reading. Conventional optical approach with beam splitter to superimpose aimer projector beam onto the imaging lens axis is not acceptable because of the bulky dimensions as well as the degradation to the image quality. To overcome this issue, a coaxial aimer imager for the imaging barcode reader is needed.

Several attempts have been made to address this issue. For example, in U.S. Pat. No. 6,179,208 by Feng discloses a portable data collection device having an imaging assembly with a 2D photosensor array. The device also includes an illumination assembly, and a lens array or panel positioned adjacent the circuit board assembly for focusing an even pattern of illumination on the target area and generating a crosshair illumination pattern for aiming the device at the target dataform. However, the invention does not mention using four aimers for creating the crosshair pattern for targeting the object. Furthermore, it also does not describe creating the aimer pattern at the center of the image from any distance. In U.S. Patent Publication No. 2003/0019934 by Hunter et al. discloses an aiming assembly of an optical reader. The aiming system of the optical reader projects an aiming pattern onto a target from a wide range of distance. However, similarly to the patent by Feng, this reference does not cover generating the aimer pattern at the center of the image from any distance. In PowerScan PBT9500 specification by Datalogic, describes a Datalogic imager equipped with liquid lens. The aiming system consists of a central cross and four dots in the corners. However, the reference does not cover creating a horizontal and/or vertical line pattern. Moreover, again, the aiming pattern is not in the center of the image at any distance.

Therefore, a need exists for a coaxial aimer imager, and an aimer pattern projector assembly.

SUMMARY

Accordingly, in one aspect, the present invention embraces a coaxial aimer imager assembly and an aimer pattern projector assembly.

In an exemplary embodiment, a coaxial aimer imager assembly includes an imaging lens-sensor module, and a coaxial aimer module. The aimer module has a central opening configured to align with a line of sight of an imaging lens of the imaging lens-sensor module. The aimer module includes aimer pattern projectors configured to create a combined aimer pattern coaxially aligned with the line of sight of the imaging lens.

In another exemplary embodiment, an aimer pattern projector assembly includes an LED light source, an LED aperture plate, and a projector lens disposed in front of and coaxial with the LED aperture plate and the LED light source. The LED light source, aperture plate, and projector lens each have a central opening configured to accommodate and coaxially align with a line of sight of an imaging lens.

In another aspect, the present invention embraces a method for scanning. The method includes generating a combined aimer pattern coaxially aligned with a line of sight of an imaging lens, projecting the generated pattern on an object displayed on a media, and capturing an image of the object.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1A:
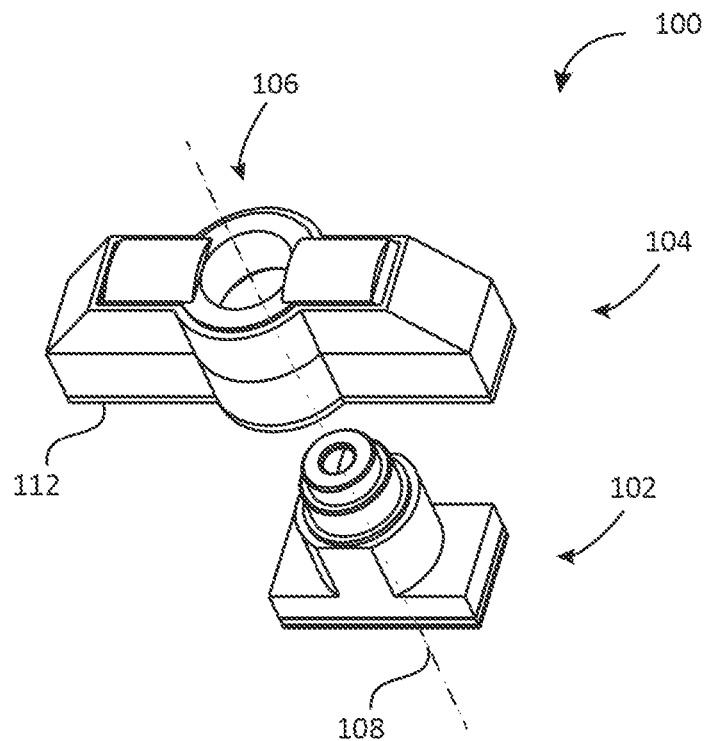
FIG. 1A schematically depicts a deconstructed view of a coaxial aimer imager assembly, according to an embodiment.
Figure 1B:
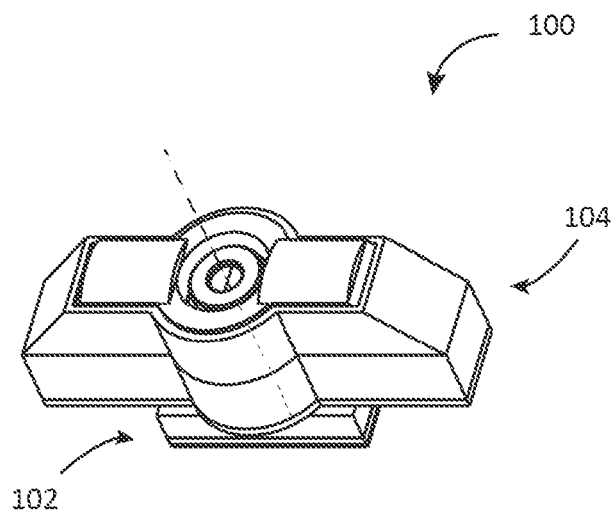
FIG. 1B schematically depicts a perspective view of the coaxial aimer imager assembly, according to an embodiment.
Figure 1C:
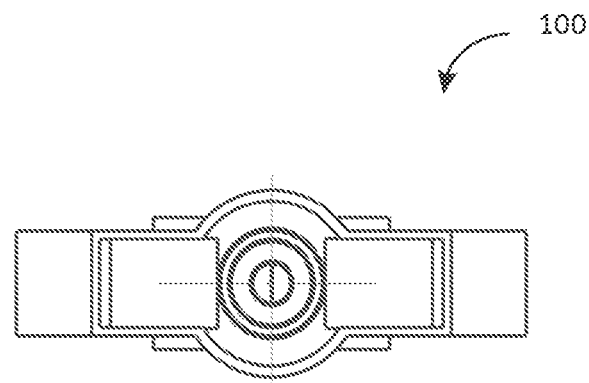
FIG. 1C schematically depicts a top view of the coaxial aimer imager assembly, according to an embodiment.
Figure 1D:
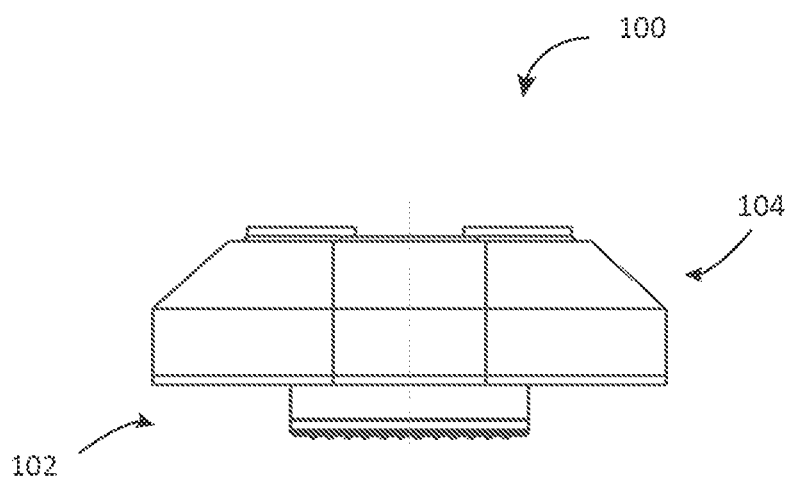
FIG. 1D schematically depicts a side view of the coaxial aimer imager assembly, according to an embodiment.

The present invention embraces a coaxial imager assembly, and method for scanning.

FIGS. 1A-1D show various views of a coaxial aimer imager assembly 100, according to an embodiment. The coaxial aimer imager assembly 100 includes an imaging lens-sensor module 102, and a coaxial aimer module 104. The coaxial aimer module 104 has a central opening 106 configured to align with a line of sight 108 of an imaging lens of the imaging lens-sensor module 102, and operably coupled to the imaging lens-sensor module 102. The coaxial aimer module 104 includes two or more aimer pattern projectors 110 (not shown) configured to create a combined aimer pattern coaxially aligned with the line of sight 108 of the imaging lens, and is operably coupled to a printed circuit board (PCB) 112.

In an embodiment, the two or more aimer pattern projectors 110 can be disposed symmetrically with respect to the line of sight 108 of the imaging lens. For example, the assembly 100 can include four aimer pattern projectors 110 configured to generate a crosshair pattern having a center aligned with the line of sight 108 of the imaging lens, and specifically an axis of the imaging lens. At an extremely close object distance, such as near contact with the aimer front, a small central area of the crosshair pattern can be blank. This small blank area will not create aiming difficulty. At larger object distances, the crosshair aimer pattern will show center of the field with the cross of the pattern lines and effective field of view with the ends of the pattern lines. Additionally, the assembly 100 can include an aimer assembly cover configured to at least partially reduce or prevent stray light emission. The cover can also be configured to improve the aimer pattern contrast.

In an embodiment, the aimer pattern projectors 110 can include line pattern generators. The aimer pattern projectors 110 can be configured to generate horizontal pattern matches to a horizontal field of view of an image. Additionally or alternatively, the aimer pattern projectors 110 can be configured to generate vertical pattern matches to a vertical field of view of an image.

Figure 2A:
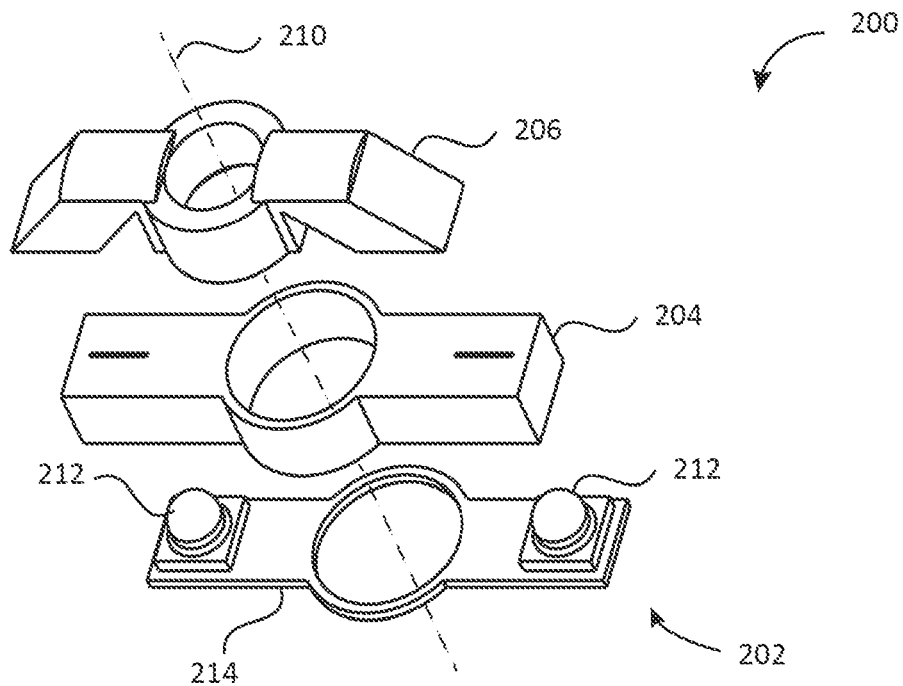
FIG. 2A schematically depicts a deconstructed top perspective view of an aimer pattern projector assembly with two LEDs, according to an embodiment.
Figure 2B:
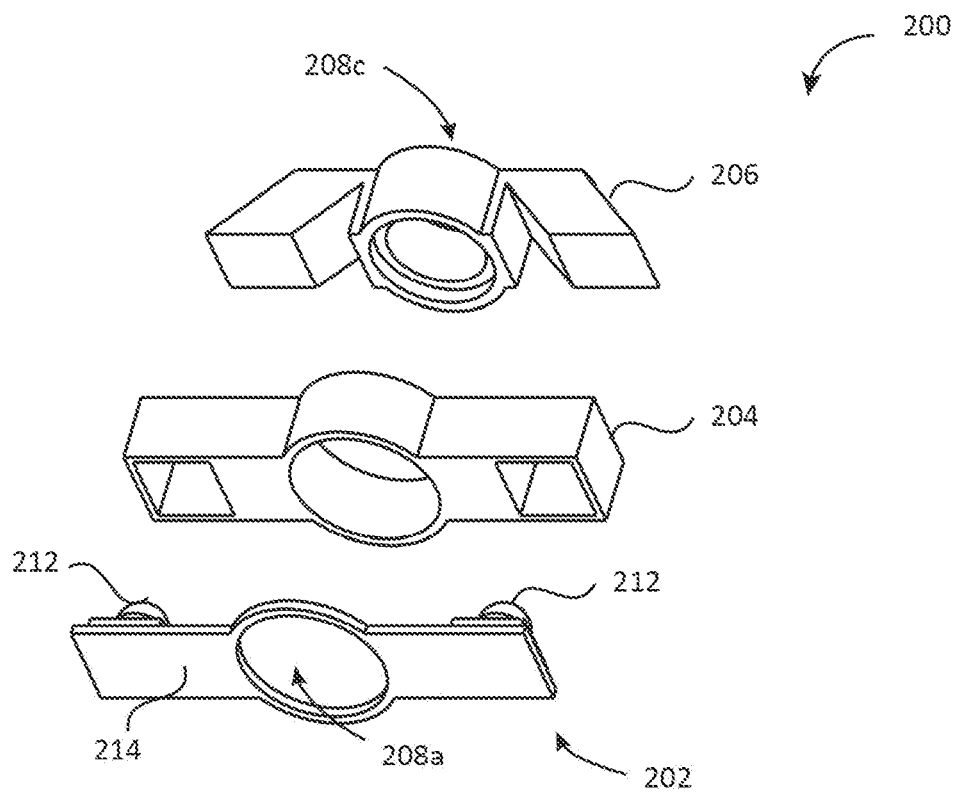
FIG. 2B schematically depicts a deconstructed bottom perspective view of the aimer pattern projector assembly with two LEDs, according to an embodiment.
Figure 2C:
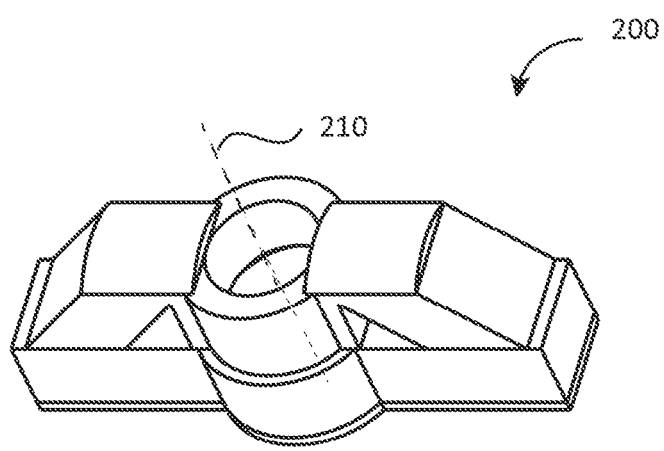
FIG. 2C schematically depicts a perspective view of the aimer pattern projector assembly with two LEDs, according to an embodiment.
Figure 3A:
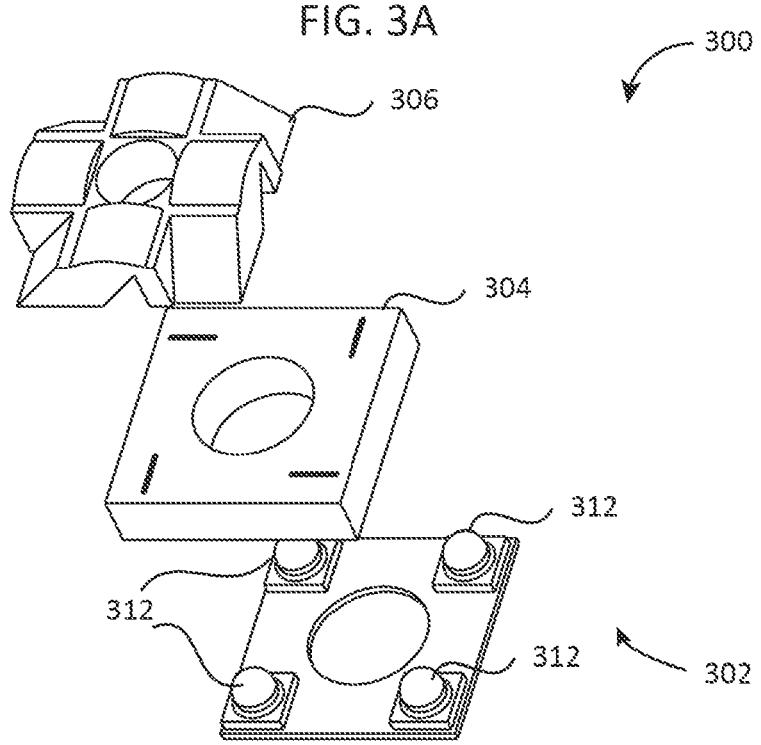
FIG. 3A schematically depicts a deconstructed top perspective view of an aimer pattern projector assembly with four LEDs, according to an embodiment.
Figure 3B:
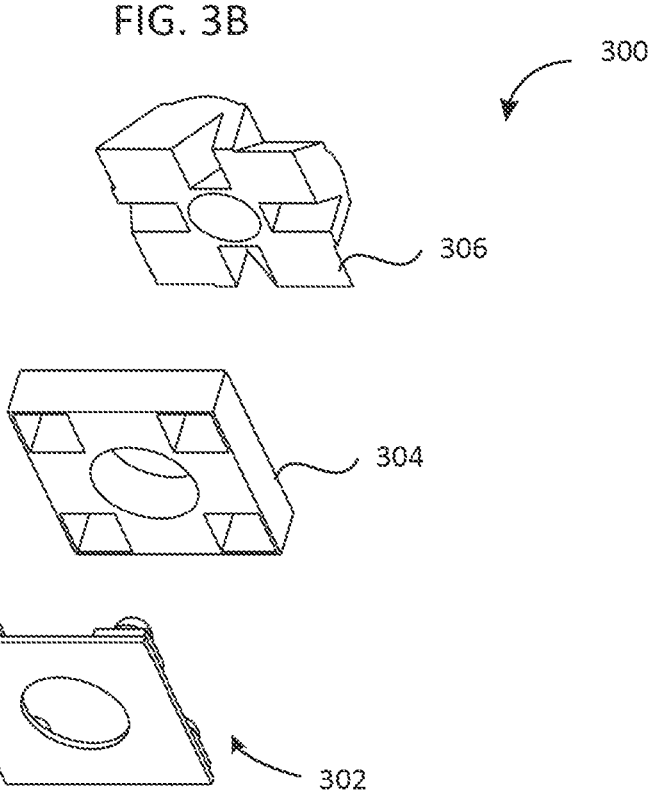
FIG. 3B schematically depicts a deconstructed bottom perspective view of the aimer pattern projector assembly with four LEDs, according to an embodiment.
Figure 3C:
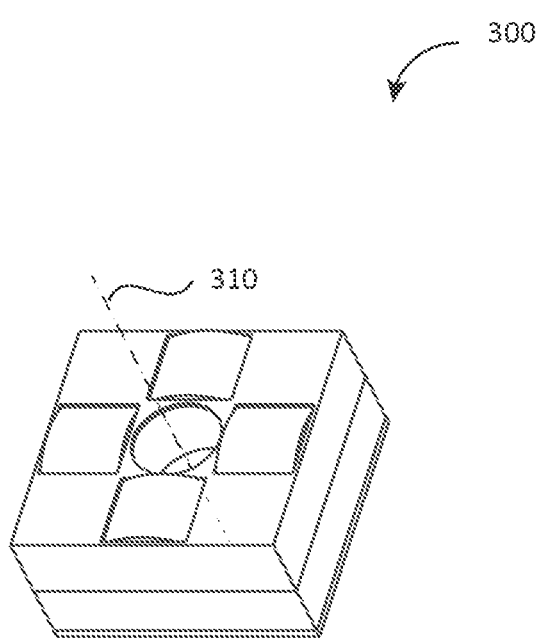
FIG. 3C schematically depicts a perspective view of the aimer pattern projector assembly with four LEDs, according to an embodiment.

FIGS. 2A-2C show various views of an aimer pattern projector assembly 200 with two LEDs, according to an embodiment. The aimer pattern projector assembly 200 includes an LED light source 202, an LED aperture plate 204 disposed in front of and coaxial with the LED light source 202, and a projector lens 206 disposed in front of and coaxial with the LED aperture plate 204. The LED light source 202, the LED aperture plate 204, and the projector lens 206 each have a central opening 208a, 208b, 208c respectively, configured to accommodate and coaxially align with a line of sight 210 of an imaging lens. Although FIGS. 2A-2C depict the assembly 200 having two LEDs 212, other numbers of LEDs are also possible. For example, FIGS. 3A-3C show various views of an aimer pattern projector assembly 300 with four LEDs, according to an embodiment.

In an embodiment, the LED aperture plate 204 can include a line shape aperture plate. The projector lens 206 can include a folded LED lens array. The LED light source 202 can include two or more LEDs operably coupled to a PCB 214. Specifically, an embodiment having two LEDs is shown in FIGS. 2A-2C, and an embodiment having four LEDs is shown in FIGS. 3A-3C. In particular, in FIGS. 3A-3C an aimer pattern projector assembly 300 includes an LED light source 302 with four LEDs 312, an LED aperture plate 304, and a projector lens 306. A line of sight 310 of an imaging lens is shown in FIG. 3C, depicting the aimer pattern projector assembly 300 with an aimer cover.

In an embodiment, the assembly 200 (300) can include a folded optics assembly configured for adjusting a length of an optical path. The assembly 200 (300) can include an LED aperture shape design configured to produce an aimer pattern, such as dots, dotted lines, and/or lines.

Figure 4A:
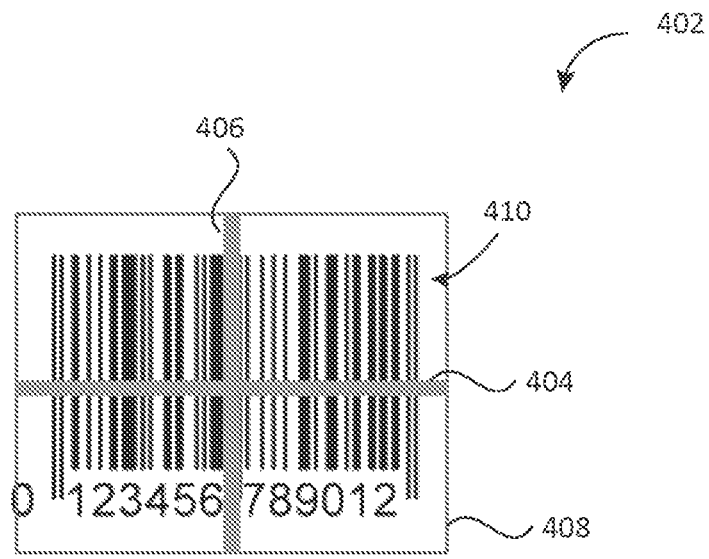
FIG. 4A schematically depicts alignment of a horizontal and vertical aimer patterns with an image field of view, according to an embodiment.
Figure 4B:
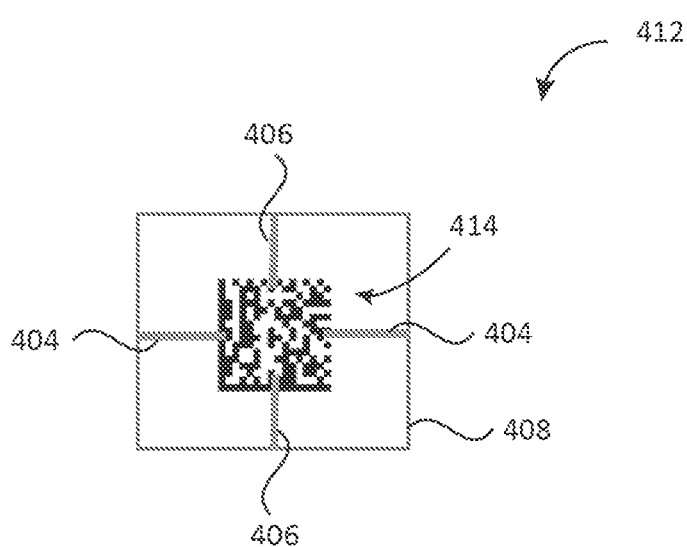
FIG. 4B schematically depicts alignment of a horizontal and vertical aimer patterns with an image field of view at a short object distance, according to an embodiment.

FIG. 4A shows alignment 402 of a horizontal 404 and vertical 406 aimer patterns with an image field of view 408, according to an embodiment. As seen in the figure, a barcode 410 is located in the center of the image field of view 408 when visual aiming is aligned. Such a pattern can be achieved, for example, by using an aimer pattern projector assembly having four LEDs with a 4-segment line pattern combined to provide crosshair aimer pattern with a central opening for an imaging lens. FIG. 4B shows alignment 412 of a horizontal 404 and vertical 406 aimer patterns with an image field of view 408 at a short object distance, according to an embodiment. Although FIG. 4A shows alignment for a 2D barcode 410, and FIG. 4B shows alignment for a Data Matrix code 414, the examples are not meant to be limiting, and are provided for illustrative purpose.

Figure 4C:
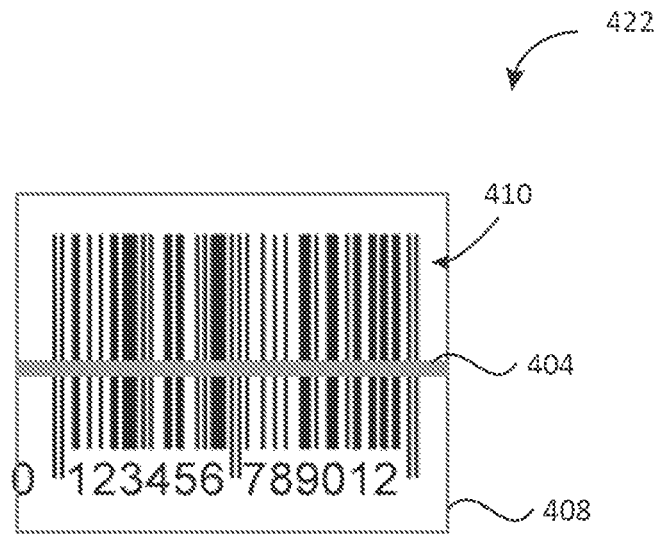
FIG. 4C schematically depicts alignment of a horizontal aimer pattern with an image field of view, according to an embodiment.
Figure 4D:
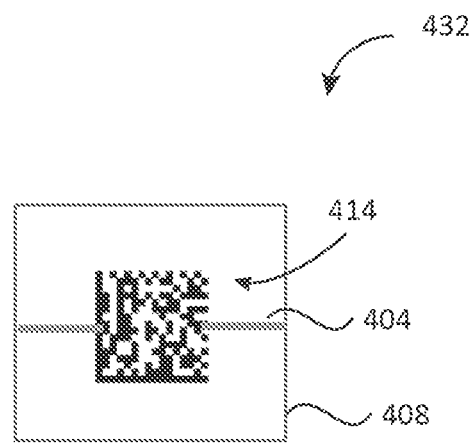
FIG. 4D schematically depicts alignment of a horizontal aimer pattern with an image field of view at a short object distance, according to an embodiment.

FIG. 4C shows alignment 422 of a horizontal aimer pattern 404 with an image field of view 408, according to an embodiment. As seen in the figure, a barcode 410 is located in the center of the image field of view 408 when visual aiming is aligned. Such a pattern can be achieved, for example, by using an aimer pattern projector assembly having two LEDs with a 2-segment line pattern. FIG. 4D shows alignment 432 of a horizontal aimer pattern 404 with an image field of view 408 at a short object distance, according to an embodiment. Although FIG. 4C shows alignment for a 2D barcode 410, and FIG. 4D shows alignment for a Data Matrix code 414, the examples are not meant to be limiting, and are provided for illustrative purpose.

Figure 5:
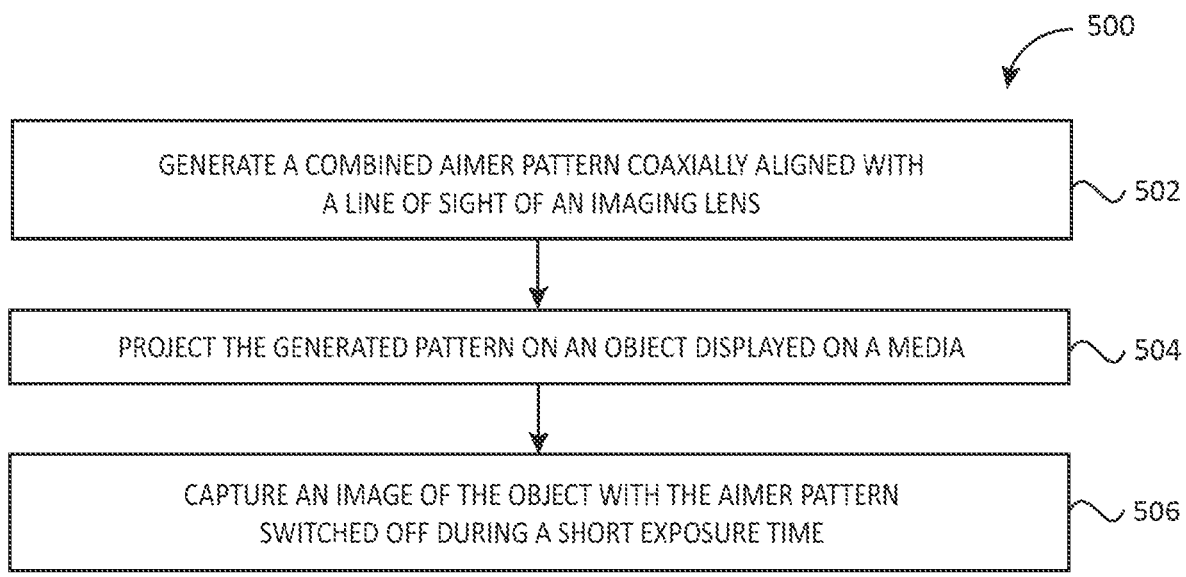
FIG. 5 schematically depicts a method for scanning, according to an embodiment.

FIG. 5 shows a method 500 for scanning, according to an embodiment. At 502, a combined aimer pattern coaxially aligned with a line of sight of an imaging lens is generated. At 504, the generated pattern is projected on an object displayed on a media. At 506, an image of the object is captured with the aimer pattern switched off during a short exposure time.

In an embodiment, generating a pattern at 502 can include generating a pattern with two or more aimer pattern projectors. The aimer pattern projectors can be disposed symmetrically with respect to the line of sight of the imaging lens. The object displayed on a media can include a barcode, for example a 2D code or a QR code. The method 500 can further include processing the captured image. Generating a combined aimer pattern at 502 can include generating an aimer pattern including dots, dotted lines, and/or lines. Other aimer patterns can be arranged with LED aperture shape design as well. Generating a combined aimer pattern at 502 can include generating horizontal and/or vertical pattern matches to a horizontal and/or vertical field of view, respectively.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;

U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;

U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A coaxial aimer imager assembly, comprising:
an imaging lens-sensor module; and
a coaxial aimer module having a central opening configured to align with a line of sight of an imaging lens of the imaging lens-sensor module, and operably coupled to the imaging lens-sensor module;
wherein the coaxial aimer module includes two or more aimer pattern projectors and operably coupled to a printed circuit board (PCB), and configured to create a combined aimer pattern coaxially aligned with the line of sight of the imaging lens.

2. The assembly according to claim 1, wherein the two or more aimer pattern projectors are disposed symmetrically with respect to the line of sight of the imaging lens.

3. The assembly according to claim 1, having four aimer pattern projectors configured to generate a crosshair pattern having a center aligned with the line of sight of the imaging lens.

4. The assembly according to claim 1, further including an aimer assembly cover configured to reduce stray light emission.

5. The assembly according to claim 1, wherein the two or more aimer pattern projectors include line pattern generators.

6. The assembly according to claim 1, wherein the aimer pattern projectors are configured to generate horizontal pattern matches to a horizontal field of view of an image.

7. The assembly according to claim 1, wherein the aimer pattern projectors are configured to generate vertical pattern matches to a vertical field of view of an image.

8. An aimer pattern projector assembly, comprising:
an LED light source;
an LED aperture plate disposed in front of and coaxial with the LED light source; and
a projector lens disposed in front of and coaxial with the LED aperture plate;
wherein the LED light source, the LED aperture plate, and the projector lens each have a central opening configured to accommodate and coaxially align with a line of sight of an imaging lens.

9. The assembly according to claim 8, wherein the LED aperture plate includes a line shape aperture plate.

10. The assembly according to claim 8, wherein the projector lens includes a folded LED lens array.

11. The assembly according to claim 8, wherein the LED light source includes two or more LEDs operably coupled to a PCB.

12. The assembly according to claim 8, further including a folded optics assembly configured for adjusting a length of an optical path.

13. The assembly according to claim 8, further configured to produce an aimer pattern including dots and/or lines.

14. A method for scanning, comprising:
generating a combined aimer pattern coaxially aligned with a line of sight of an imaging lens;
projecting the generated pattern on an object displayed on a media; and
capturing an image of the object with the aimer pattern switched off during a short exposure time.

15. The method according to claim 14, wherein generating a pattern includes generating a pattern with two or more aimer pattern projectors.

16. The method according to claim 15, wherein generating a pattern with two or more aimer pattern projectors includes generating a pattern with aimer pattern projectors disposed symmetrically with respect to the line of sight of the imaging lens.

17. The method according to claim 14, wherein the object displayed on a media includes a barcode.

18. The method according to claim 14, further including processing the captured image.

19. The method according to claim 14, wherein generating a combined aimer pattern includes generating an aimer pattern including dots and/or lines.

20. The method according to claim 14, wherein generating a combined aimer pattern includes generating horizontal and/or vertical pattern matches to a horizontal and/or vertical field of view, respectively.

* * * * *